United States Patent
Baek et al.

(10) Patent No.: US 11,374,212 B2
(45) Date of Patent: Jun. 28, 2022

(54) MULTILAYER POSITIVE ELECTRODE FOR LITHIUM SECONDARY BATTERY AND METHOD FOR MANUFACTURING THE SAME

(71) Applicant: LG Chem, Ltd., Seoul (KR)

(72) Inventors: Joo-Yul Baek, Daejeon (KR); Jong-Heon Seol, Daejeon (KR); Ye-Lin Kim, Daejeon (KR); Je-Young Kim, Daejeon (KR); Jung-Keun Yoo, Daejeon (KR)

(73) Assignee: LG Energy Solution, Ltd.

( * ) Notice: Subject to any disclaimer, the term of this patent is extended or adjusted under 35 U.S.C. 154(b) by 179 days.

(21) Appl. No.: 16/470,820

(22) PCT Filed: Jun. 26, 2018

(86) PCT No.: PCT/KR2018/007235
§ 371 (c)(1),
(2) Date: Jun. 18, 2019

(87) PCT Pub. No.: WO2019/004704
PCT Pub. Date: Jan. 3, 2019

(65) Prior Publication Data
US 2019/0312259 A1      Oct. 10, 2019

(30) Foreign Application Priority Data

Jun. 27, 2017   (KR) .................. 10-2017-0081351

(51) Int. Cl.
*H01M 4/00*        (2006.01)
*H01M 4/139*       (2010.01)
(Continued)

(52) U.S. Cl.
CPC ............. *H01M 4/139* (2013.01); *H01M 4/04* (2013.01); *H01M 4/13* (2013.01); *H01M 4/366* (2013.01);
(Continued)

(58) Field of Classification Search
CPC .......... H01M 4/139; H01M 4/62; H01M 4/04; H01M 4/13; H01M 4/366; H01M 4/625;
(Continued)

(56) References Cited

U.S. PATENT DOCUMENTS

2008/0318133 A1* 12/2008 Matsuyama .......... H01M 4/366
                                                            429/300
2010/0285356 A1   11/2010 Choi et al.
(Continued)

FOREIGN PATENT DOCUMENTS

CN        104321912 A      1/2015
CN        106716688 A      5/2017
(Continued)

OTHER PUBLICATIONS

International Search Report from PCT/KR2018/007235 dated Oct. 19, 2018, 2 pages.
(Continued)

*Primary Examiner* — Nicholas P D'Aniello
(74) *Attorney, Agent, or Firm* — Lerner, David, Littenberg, Krumholz & Mentlik, LLP

(57) ABSTRACT

A positive electrode for a lithium secondary battery includes a positive electrode current collector; a lower positive electrode active material layer disposed on at least one surface of the positive electrode current collector; and an upper positive electrode active material layer disposed on the lower positive electrode active material layer, wherein the lower positive electrode active material layer includes 90% or more of a sphere-type carbonaceous conductive material (Continued)

as a conductive material, the upper positive electrode active material layer includes 90% or more of a needle-type carbonaceous conductive material as a conductive material, and the content of the conductive material contained in the lower positive electrode active material layer is larger than the content of the conductive material contained in the upper positive electrode active material layer.

8 Claims, 6 Drawing Sheets

(51) Int. Cl.
| | | |
|---|---|---|
| *H01M 4/36* | (2006.01) | |
| *H01M 4/62* | (2006.01) | |
| *H01M 10/052* | (2010.01) | |
| *H01M 4/04* | (2006.01) | |
| *H01M 4/13* | (2010.01) | |
| *H01M 4/02* | (2006.01) | |

(52) U.S. Cl.
CPC .............. *H01M 4/62* (2013.01); *H01M 4/625* (2013.01); *H01M 10/052* (2013.01); *H01M 2004/021* (2013.01); *H01M 2004/028* (2013.01)

(58) Field of Classification Search
CPC ......... H01M 10/052; H01M 2004/021; H01M 2004/028; H01M 4/0404; H01M 4/0471; Y02E 60/10; Y02P 70/50
See application file for complete search history.

(56) References Cited

U.S. PATENT DOCUMENTS

| | | |
|---|---|---|
| 2012/0052400 A1 | 3/2012 | Kim et al. |
| 2013/0224584 A1* | 8/2013 | Sung ................. H01M 10/0525 |
| | | 429/211 |
| 2014/0363736 A1 | 12/2014 | Kim et al. |
| 2016/0156018 A1 | 6/2016 | Kim |
| 2017/0256788 A1 | 9/2017 | Umeyama et al. |
| 2017/0365858 A1 | 12/2017 | Yun et al. |
| 2018/0006291 A1 | 1/2018 | Kim et al. |
| 2019/0229330 A1* | 7/2019 | Kim ...................... H01M 4/622 |

FOREIGN PATENT DOCUMENTS

| | | |
|---|---|---|
| EP | 3182487 A1 | 6/2017 |
| JP | 2011009203 A | 1/2011 |
| JP | 2012064537 A | 3/2012 |
| KR | 20100121387 A | 11/2010 |
| KR | 20120020896 A | 3/2012 |
| KR | 20130116027 A | 10/2013 |
| KR | 101495302 B1 | 2/2015 |
| KR | 20160065282 A | 6/2016 |
| KR | 20160111673 A | 9/2016 |
| KR | 20160122380 A | 10/2016 |
| WO | 2017099272 A1 | 6/2017 |

OTHER PUBLICATIONS

Chinese Search Report for Application No. 201880005012.X dated Aug. 4, 2021, pp. 1-2.

* cited by examiner

MULTILAYER POSITIVE ELECTRODE FOR LITHIUM SECONDARY BATTERY AND METHOD FOR MANUFACTURING THE SAME

CROSS-REFERENCE TO RELATED APPLICATIONS

This application is a national phase entry under 35 U.S.C. § 371 of International Application No. PCT/KR2018/007235, filed Jun. 26, 2018, which claims priority to Korean Patent Application No. 10-2017-0081351, filed Jun. 27, 2017, the disclosures of which are incorporated herein by reference.

TECHNICAL FIELD

The present disclosure relates to a positive electrode for a lithium secondary battery and a method for manufacturing the same. More particularly, the present disclosure relates to a positive electrode for a lithium secondary battery which provides improved high-temperature storage performance, interface resistance and diffusion resistance at the same time, and a method for manufacturing the same.

BACKGROUND ART

Recently, energy storage technology has been given increasing attentions. Efforts into research and development for electrochemical devices have been actualized more and more, as the application of energy storage technology has been extended to energy for cellular phones, camcorders and notebook PC and even to energy for electric vehicles.

In this context, electrochemical devices have been most spotlighted. Among such electrochemical devices, development of rechargeable secondary batteries has been focused. Recently, when developing such batteries, research and development for designing novel electrodes and batteries have been conducted in order to improve capacity density and specific energy.

Among the commercially available secondary batteries, lithium secondary batteries developed in the early 1990's have been spotlighted, since they have a higher operating voltage and significantly higher energy density as compared to conventional batteries, such as Ni-MH batteries, N—Cd batteries and sulfuric acid-lead batteries using an aqueous electrolyte.

FIG. 1 illustrates an embodiment of the electrode used for a lithium secondary battery. As shown in FIG. 1, a positive electrode active material layer 20 including a positive electrode active material, conductive material and a binder polymer is formed on a positive electrode current collector 10 to provide a positive electrode.

Many studies have been conducted to improve the performance of such a lithium secondary battery. However, it is difficult to satisfy diffusion resistance and interface resistance at the same time, while satisfying the high-temperature storage performance of a battery.

DISCLOSURE

Technical Problem

The present disclosure is directed to providing a positive electrode for a lithium secondary battery which provides improved high-temperature storage performance, diffusion resistance and interface resistance at the same time to a satisfactory level.

The present disclosure is also directed to providing a method for manufacturing the positive electrode for a lithium secondary battery.

Technical Solution

In one aspect of the present disclosure, there is provided a positive electrode for a lithium secondary battery including: a positive electrode current collector; a lower positive electrode active material layer disposed on at least one surface of the positive electrode current collector; and an upper positive electrode active material layer disposed on the lower positive electrode active material layer, wherein the lower positive electrode active material layer includes 90% or more of a sphere-type carbonaceous conductive material as a conductive material, the upper positive electrode active material layer includes 90% or more of a needle-type carbonaceous conductive material as a conductive material, and the content of the conductive material contained in the lower positive electrode active material layer is larger than the content of the conductive material contained in the upper positive electrode active material layer.

The sphere-type carbonaceous conductive material may be present in an amount of 1.0-3.0 wt % based on the total weight of the lower positive electrode active material layer. The needle-type carbonaceous conductive material may be present in an amount of 0.2-1.0 wt % based on the total weight of the upper positive electrode active material layer.

The sphere-type carbonaceous conductive material may include carbon black, and the needle-type carbonaceous conductive material may include carbon nanotubes (CNT), vapor-grown carbon fibers (VGCF), carbon nanofibers (CNF) or a combination of two or more of them.

The upper positive electrode active material layer and the lower positive electrode active material layer may have a thickness ratio of 90:10-50:50.

In another aspect of the present disclosure, there is also provided a method for manufacturing a positive electrode for a lithium secondary battery, the method including: dispersing a first positive electrode active material, a first conductive material and a first binder polymer into a solvent to prepare slurry for a lower positive electrode active material layer, and dispersing a second positive electrode active material, a second conductive material and a second binder polymer into a solvent to prepare slurry for an upper positive electrode active material layer; applying the slurry for a lower positive electrode active material layer to at least one surface of a positive electrode current collector; and further applying the slurry for an upper positive electrode active material layer thereto, before or after the slurry for a lower positive electrode active material layer is dried, wherein the slurry for lower positive electrode active material layer includes 90% or more of a sphere-type carbonaceous conductive material as a conductive material, the slurry for the upper positive electrode active material layer includes 90% or more of a needle-type carbonaceous conductive material as a conductive material, and the content of the conductive material contained in the slurry for the lower positive electrode active material layer is larger than the content of the conductive material contained in the slurry for the upper positive electrode active material layer.

In still another aspect of the present disclosure, there is provided a lithium secondary battery including the positive electrode for a lithium secondary battery.

Advantageous Effects

According to an embodiment of the present disclosure, there is provided a positive electrode for a lithium secondary battery which provides improved high-temperature storage performance, diffusion resistance and interface resistance at the same time to a satisfactory degree.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
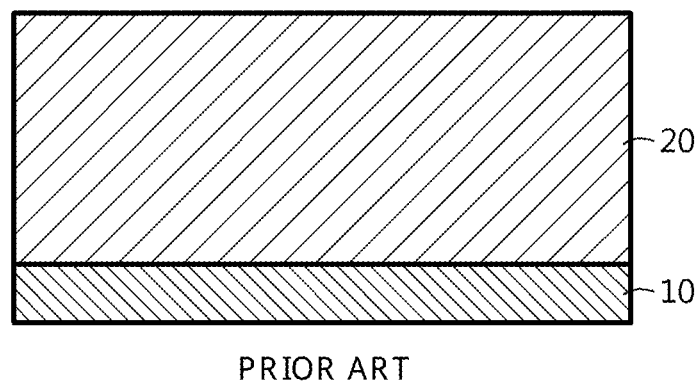
FIG. 1 is a sectional view illustrating the positive electrode according to the related art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a positive electrode for a lithium secondary battery including: a positive electrode current collector; a lower positive electrode active material layer disposed on at least one surface of the positive electrode current collector; and an upper positive electrode active material layer disposed on the lower positive electrode active material layer, wherein the lower positive electrode active material layer includes a larger amount of conductive material as compared to the upper positive electrode active material layer.

In the positive electrode according to an embodiment of the present disclosure, the conductive material of the lower positive electrode active material layer adjacent to the current collector substantially includes a sphere-type conductive material. In other words, the lower positive electrode active material layer includes, as a conductive material, a sphere-type carbonaceous conductive material in an amount of 90% or more, particularly 95% or more, and more particularly 98% or more. Herein, 'sphere-type' means a spherical particle shape whose average diameter (D50) is 10-500 nm, particularly 15-100 nm, or 15-40 nm.

The sphere-type carbonaceous conductive material fills up the pores, i.e. vacant spaces, among the active material particles in combination with the binder to improve the physical contact among the active material particles, resulting in a drop in interface resistance and improvement of the adhesion between the lower active material layer and the current collector.

Thus, it is possible to solve the problems of an increase in resistance and degradation of high-temperature storage performance caused by the interface resistance between the current collector and the active material layer, and an increase in resistance caused by separation between the current collector and the active material layer resulting from insufficient adhesion caused by binder migration occurring at the interface between the current collector and the active material layer (i.e. at the region where adhesion is realized between the current collector and the active material layer).

The sphere-type carbonaceous conductive material may be present in the lower positive active material layer in an amount of 1.0-3.0 wt %. When the content of the sphere-type carbonaceous conductive material is less than 1.0 wt %, it is not possible to perform a main function of the conductive material, i.e., formation of a conductive network. Thus, it is difficult to impart sufficient conductivity. When the content of the sphere-type carbonaceous conductive material is larger than 3.0 wt %, the pores of the active material layer are blocked to cause an increase in diffusion resistance. In addition, the conductive material is used in an unnecessarily large amount, which is a waste. Further, the content of the active material is reduced, which may result in degradation of the capacity of a battery cell.

The sphere-type carbonaceous conductive material may be carbon black, including Denka black, and particular examples thereof include FX35 (available from Denka), SB50L (available from Denka), Super-P, or the like, but are not limited thereto.

In the positive electrode according to an embodiment of the present disclosure, the upper positive electrode active material layer is disposed on the lower positive electrode active material layer as described above, and is characterized in that the conductive material substantially includes a needle-type carbonaceous conductive material. In other words, the upper positive electrode active material layer includes, as a conductive material, a needle-type carbonaceous conductive material in an amount of 90% or more, particularly 95% or more, and more particularly 98% or more. Herein, 'needle-type' means a needle-like particle shape whose aspect ratio (ratio of length/diameter) is 50-650, particularly 60-300, or 100-300.

When such a sphere-type carbonaceous conductive material is used for the upper positive electrode active material layer, there is an advantage in that dispersion is facilitated as compared to the needle-type conductive material. However, electroconductivity is decreased as compared to the needle-type carbonaceous conductive material to cause an increase in resistance, and there is a disadvantage in that improvement of diffusion resistance is less effective as compared to the needle-type carbonaceous conductive material.

The needle-type carbonaceous conductive material is distributed while surrounding the surface of the active material between the active material particles in the active material layer. Thus, it is possible to facilitate formation of a conductive network and to reduce the amount of the conductive material. In addition, the pores of the active material particles (vacant spaces between the active material particles) are not blocked to facilitate formation of pores, which allows smooth diffusion of lithium ions and results in a decrease in diffusion resistance.

The needle-type carbonaceous conductive material may be used in the upper positive electrode active material layer in an amount of 0.2-1.0 wt %, or 0.4-0.8 wt %. When the content of the needle-type carbonaceous conductive material is less than 0.2 wt %, it is not possible to perform a main function of the conductive material, i.e., formation of a conductive network. When the content of the needle-type carbonaceous conductive material is larger than 1.0 wt %, there are disadvantages in that it is not possible to improve interface resistance and it is not possible to facilitate dispersion. Additionally, in this case, the conductive material is used in an unnecessarily large amount, which is a waste. Further, the content of the active material is reduced, which may result in degradation of the capacity of a battery cell.

The needle-type carbonaceous conductive material may include carbon nanotubes (CNT), vapor-grown carbon fibers (VGCF), carbon nanofibers (CNF) or a combination of two or more of them.

In the positive electrode according to an embodiment of the present disclosure, the total thickness including the upper positive electrode active material layer and the lower positive electrode active material layer may be 50-180 μm based on the pre-pressing thickness, or 30-120 μm based on the post-pressing thickness. The upper positive electrode active material layer may have a thickness which is the same as or larger than the thickness of the lower positive electrode active material layer. For example, the upper positive electrode active material layer and the lower positive electrode active material layer may have a thickness ratio of 90:10-50:50. For example, the upper positive electrode active material layer and the lower positive electrode active material layer may be formed to have a thickness ratio of 90:10, 70:30, or 50:50, but are not limited thereto. When the upper positive electrode active material layer is formed to have a smaller thickness as compared to the lower positive electrode active material layer, one of the main effects of the present disclosure i.e., the effect of improving diffusion resistance through the upper positive electrode active material layer, is degraded. When the lower positive electrode active material layer has a thickness less than 1/10 of the thickness of the positive electrode active material layer, it is not possible to obtain a sufficient effect of improving interface resistance through the lower positive electrode active material layer.

According to an embodiment of the present disclosure, besides the conductive material, each of the upper positive electrode active material layer and the lower positive electrode active material layer includes an active material and a binder polymer, and may further include additive for a positive electrode used conventionally in the art, if desired.

The positive electrode active material that may be used for the upper positive electrode active material layer and the lower positive electrode active material layer may independently include a lithium-containing oxide and may be the same or different. Preferably, the lithium-containing oxide includes a lithium-containing transition metal oxide. Particular examples of the lithium-containing transition metal oxide include any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, O≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), or a combination of two or more of them. The lithium-containing transition metal oxide may be coated with a metal, such as aluminum (Al) or metal oxide. In addition to the lithium-containing transition metal oxide, sulfide, selenide or halide may be used.

The current collector used for the positive electrode is a metal having high conductivity, and any metal may be used without particular limitation, as long as it allows easy adhesion of the positive electrode active material and binder polymer and has no reactivity in the voltage range of an electrochemical device. Particular examples of the positive electrode current collector include foil made of aluminum, nickel or a combination thereof.

The positive electrode active material may be used in the positive electrode active material layer in an amount of 94.0-98.5 wt %. When the content of the positive electrode active material satisfies the above-defined range, it is possible to manufacture a high-capacity battery, to provide a positive electrode with sufficient conductivity and to impart adhesion between materials of the electrode.

Any binder polymer used conventionally in the art may be used without particular limitation for each of the upper positive electrode active material layer and the lower positive electrode active material layer. For examples, various types of binder polymers, such as polyvinylidene fluoride-co-hexafluoro propylene (PVDF-co-HFP), polyvinylidene fluoride (PVDF), polyacrylonitrile, polymethyl methacrylate, styrene-butadiene rubber (SBR) or carboxymethyl cellulose (CMC), etc. may be used.

The content of the binder polymer is in proportion to the content of the conductive material contained in each of the upper positive electrode active material layer and the lower positive electrode active material layer. This is intended to impart adhesion to the conductive material having a significantly smaller particle size as compared to the active material. When the content of the conductive material is increased, an additional amount of binder polymer is required. When the content of the conductive material is decreased, a smaller amount of binder polymer may be used.

In the positive electrode according to an embodiment of the present disclosure, 180-380 parts by weight of the binder polymer may be used based on 100 parts by weight of the needle-type carbonaceous conductive material, in the upper positive electrode active material layer. In the lower positive electrode active material layer, 50-200 parts by weight of the binder polymer may be used based on 100 parts by weight of the sphere-type carbonaceous conductive material. For example, when using a polyvinylidene fluoride binder polymer (KF9700, available from Kureha) having a molecular weight of 880,000 g/mol, the lower positive electrode active material layer may include 1.5 wt % of carbon black and 2.25 wt % of the binder polymer, and the upper positive electrode active material layer may include 0.6 wt % of carbon nanotubes and 1.7 wt % of the binder polymer. When the molecular weight of the binder polymer is relatively low, it is required to increase the content of the binder polymer to ensure sufficient adhesion to a positive electrode. When the molecular weight of the binder polymer is relatively high, it is possible to reduce the content of the binder polymer.

In another aspect of the present disclosure, there is provided a method for manufacturing a positive electrode for a lithium secondary battery, the method including the steps of:

dispersing a first positive electrode active material, a first conductive material and a first binder polymer into a solvent to prepare slurry for a lower positive electrode active material layer, and dispersing a second positive electrode active material, a second conductive material and a second binder polymer into a solvent to prepare slurry for an upper positive electrode active material layer;

applying the slurry for a lower positive electrode active material layer to at least one surface of a positive electrode current collector; and further applying the slurry for an upper positive electrode active material layer thereto, before or after the slurry for a lower positive electrode active material layer is dried.

Herein, the content of the first conductive material contained in the slurry for the lower positive electrode active material layer is larger than the content of the second conductive material contained in the slurry for the upper positive electrode active material layer.

In the method according to an embodiment of the present disclosure, the slurry for the lower positive electrode active material layer includes 90% or more of a sphere-type carbonaceous conductive material as a conductive material, and the slurry for the upper positive electrode active material layer includes 90% or more of a needle-type carbonaceous conductive material as a conductive material.

In addition, the sphere-type carbonaceous conductive material is used in an amount of 1.0-3.0 wt % based on the solid content of the slurry for a lower positive electrode active material layer. The needle-type carbonaceous conductive material is used in an amount of 0.2-1.0 wt % based on the solid content of the slurry for an upper positive electrode active material layer. This is because of the reasons as described herein above with reference to the positive electrode.

Meanwhile, in the specification, the process for applying the slurry for an upper positive electrode active material layer before the slurry for a lower positive electrode active material layer is dried is referred to as 'wet-on-wet' process, while the process for applying the slurry for an upper positive electrode active material layer after the slurry for a lower positive electrode active material layer is dried is referred to as 'wet-on-dry' process.

Each of the slurry for an upper positive electrode active material layer and the lower positive electrode active material layer may be applied independently by using a coating system, such as a slot-die coater, roll-coater, knife coater or extrusion coater, used conventionally in the art, successively. Otherwise, the two layers may be applied substantially at the same time by using a single coating head having two outlets or an extrusion coater or 2-slot die having a back-up roll.

When using the wet-on-wet process, the slurry for an upper positive electrode active material layer is applied before the slurry for a lower positive electrode active material layer is dried completely, while the slurry includes a solvent in an amount of 10-40 wt %. Then, the method may further include a step of drying the upper slurry and lower slurry at a temperature of about 100-150° C. for 5 minutes to 1 hour.

When using the wet-on-dry process, the slurry for an upper positive electrode active material layer is applied after the slurry for a lower positive electrode active material layer is dried completely. The method may further include a step of drying the lower slurry at a temperature of about 100-150° C. for 5 minutes to 1 hour, and successively drying the upper slurry at a temperature of about 100-150° C. for 5 minutes to 1 hour.

Figure 2:
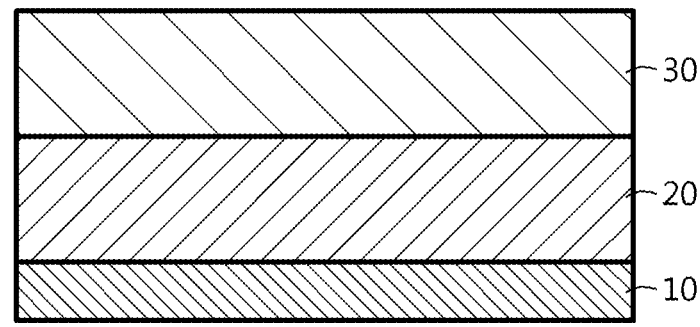
FIG. 2 is a sectional view illustrating the positive electrode according to an embodiment of the present disclosure.

The section of the positive electrode obtained as described above according to an embodiment of the present disclosure is shown in FIG. 2 schematically. A lower positive electrode active material layer 20 using a sphere-type carbonaceous conductive material is formed on a positive electrode current collector 10, and an upper positive electrode active material layer 30 using a needle-type carbonaceous conductive material is formed thereon.

In still another aspect, there is provided an electrochemical device which includes: an electrode assembly including the positive electrode as described above, a negative electrode and a separator interposed between the positive electrode and the negative electrode; a nonaqueous electrolyte injected to the electrode assembly; and a battery casing receiving the electrode assembly and the nonaqueous electrolyte.

The negative electrode may include, as a negative electrode active material, a carbonaceous material, lithium metal, silicon or tin. When a carbonaceous material is used as a negative electrode active material, both low crystalline carbon and high crystalline carbon may be used. Typical examples of low crystalline carbon include soft carbon and hard carbon. Typical examples of high crystalline carbon include Kish graphite, pyrolytic carbon, mesophase pitch based carbon fibers, meso-carbon microbeads, mesophase pitches, and high-temperature baked carbon, such as petroleum or coal tar pitch-derived cokes.

Non-limiting examples of the current collector for the negative electrode include foil made of copper, gold, nickel, copper alloy or a combination thereof. In addition, substrates including the above-mentioned materials may be stacked and used as the current collector.

The negative electrode may further include a conductive material and a binder used conventionally in the art.

According to the present disclosure, the separator may be any porous substrate used for an electrochemical device. Particular examples of the porous substrate may include a polyolefin-based porous membrane or nonwoven web, but are not limited thereto.

Particular examples of the polyolefin-based porous membrane include a membrane formed of a polymer including a polyolefin-based polymer, such as polyethylene (e.g. high density polyethylene, linear low density polyethylene, low density polyethylene or ultrahigh molecular weight polyethylene), polypropylene, polybutyelene or polypentene, alone or in combination.

In addition to the polyolefin-based nonwoven web, particular examples of the nonwoven web include a nonwoven web formed of a polymer including polyethylene terephthalate, polybutylene terephthalate, polyester, polyacetal, polyamide, polycarbonate, polyimide, polyetheretherketone, polyethersulfone, polyphenylene oxide, polyphenylene sulfide or polyethylene naphthalene, alone or in combination.

The structure of the nonwoven web may be a spunbond nonwoven web or melt blown nonwoven web including long fibers.

There is no particular limitation in thickness of the porous substrate. The porous substrate may have a thickness of 5-50 µm. In addition, the size of pores present in the porous substrate and the porosity are not particularly limited. However, the pore size and porosity may be 0.01-50 µm and 10-95%, respectively.

Meanwhile, the porous substrate may further include a porous coating layer including inorganic particles and a binder polymer, on at least one surface thereof, in order to improve the mechanical strength of the separator including the porous substrate and to inhibit a short-circuit between the positive electrode and the negative electrode.

Meanwhile, the non-aqueous electrolyte may include an organic solvent and an electrolyte salt. The electrolyte salt is a lithium salt. Any lithium salt used conventionally for a nonaqueous electrolyte for a lithium secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or a combination of two or more of them.

Particular examples of the organic solvent that may be contained in the non-aqueous electrolyte may include those used conventionally for an electrolyte for a lithium secondary battery with no particular limitation. For example, it is possible to use ethers, esters, amides, linear carbonates or cyclic carbonates alone or in combination. Typical examples of the organic solvent may include carbonate compounds such as cyclic carbonates, linear carbonates or mixtures thereof.

Particular examples of the cyclic carbonate compounds include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate and halides thereof, or a combination of two or more of them. Particular examples of such halides include fluoroethylene carbonate (FEC) but are not limited thereto.

In addition, particular examples of the linear carbonate compounds include any one selected from the group consisting of dimethyl carbonate (DMC), diethyl carbonate (DEC), dipropyl carbonate, ethyl methyl carbonate (EMC), methyl propyl carbonate and ethyl propyl carbonate, or a combination of two or more of them, but are not limited thereto.

Particularly, ethylene carbonate and propylene carbonate, which are cyclic carbonates among the carbonate organic solvents, have a high dielectric constant and dissociate the lithium salt in an electrolyte well. In addition, it is possible to prepare an electrolyte having high electroconductivity when using such cyclic carbonates in combination with low-viscosity low-dielectric constant linear carbonates, such as dimethyl carbonate and diethyl carbonate, at an adequate ratio.

Further, among the organic solvents, particular examples of the ethers may include any one selected from the group consisting of dimethyl ether, diethyl ether, dipropyl ether, methyl ethyl ether, methyl propyl ether and ethyl propyl ether, or a combination of two or more of them, but are not limited thereto.

Among the organic solvents, particular examples of the esters include any one selected from the group consisting of methyl acetate, ethyl acetate, propyl acetate, methyl propionate, ethyl propionate, γ-butyrolactone, γ-valerolactone, γ-caprolactone, σ-valerolactone and ε-caprolactone, or a combination of two or more of them, but are not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Herein, the electrochemical device includes any device which carries out electrochemical reaction, and particular examples thereof include all types of primary batteries, secondary batteries, fuel cells, solar cells or capacitors such as super capacitor devices. Particularly, the secondary batteries may include lithium secondary batteries, including lithium metal secondary batteries, lithium ion secondary batteries, lithium polymer secondary batteries or lithium ion polymer ion batteries.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, 96.25 wt % of NCM ($LiNi_{0.6}Co_{0.2}Mn_{0.2}O_2$) as a positive electrode active material, 1.5 wt % of carbon black (FX35, Denka, Sphere type, average diameter (D50) 15-40 nm) as a conductive material and 2.25 wt % of polyvinylidene fluoride (KF9700, Kureha) as a binder polymer were added to N-methyl-2-pyrrolidone (NMP) as a solvent to form slurry for a lower positive electrode active material layer.

In addition, 97.7 wt % of NCM ($LiNi_{0.6}Co_{0.2}Mn_{0.2}O_2$) as a positive electrode active material, 0.6 wt % of carbon nanotubes (LUCAN-BT1001M, LG Chem., aspect ratio 100-300) as a conductive material and 1.7 wt % of KF9700 (Kureha) as a binder polymer were added to N-methyl-2-pyrrolidone (NMP) as a solvent to form slurry for an upper positive electrode active material layer.

The slurry for a lower positive electrode active material layer was coated on aluminum foil in a loading amount of 320 mg/25 cm² (coating thickness: 50 µm), and the slurry for an upper positive electrode active material layer was further coated thereon in a loading amount of 320 mg/25 cm² (coating thickness: 50 µm) so that the thickness ratio of the lower positive electrode active material layer and the upper positive electrode active material layer might be 50:50. Then, vacuum drying was carried out to obtain a positive electrode.

Example 2

A positive electrode was obtained in the same manner as described in Example 1, except that the upper positive electrode active material layer was coated to a thickness of 70 μm and the lower positive electrode active material layer was coated to a thickness of 30 μm (thickness ratio 70:30).

Example 3

A positive electrode was obtained in the same manner as described in Example 1, except that the upper positive electrode active material layer was coated to a thickness of 90 μm and the lower positive electrode active material layer was coated to a thickness of 10 μm (thickness ratio 90:10).

Comparative Example 1

First, 96.25 wt % of NCM ($LiNi_{0.6}Co_{0.2}Mn_{0.2}O_2$) as a positive electrode active material, 1.5 wt % of carbon black (FX35, Denka, Sphere type, average diameter (D50) 15-40 nm) as a conductive material and 2.25 wt % of polyvinylidene fluoride (KF9700, Kureha) as a binder polymer were added to N-methyl-2-pyrrolidone (NMP) as a solvent to form slurry for a positive electrode active material layer.

The slurry for a positive electrode active material layer was coated on aluminum foil in a loading amount of 640 mg/25 cm$^2$, and then vacuum drying was carried out to obtain a positive electrode.

Comparative Example 2

A positive electrode was obtained in the same manner as described in Comparative Example 1, except that 97.7 wt % of NCM ($LiNi_{0.6}Co_{0.2}Mn_{0.2}O_2$) was used as a positive electrode active material, 0.6 wt % of carbon nanotubes was used as a positive electrode conductive material, and 1.7 wt % of polyvinylidene fluoride (KF9700, Kureha) was used as a binder polymer.

Comparative Example 3

A positive electrode was obtained in the same manner as described in Example 1, except that carbon black (FX35, Denka) was used in an amount of 0.6 wt % to obtain slurry for a lower positive electrode active material layer, and carbon nanotubes were used in an amount of 1.5 wt % to obtain slurry for an upper positive electrode active material layer.

Test Example: Scanning Electron Microscopic (SEM) Images

The section of each of the positive electrodes according to Example 1 and 2 was observed by SEM (S-4800, Hitachi). The results are shown in FIG. 3 and FIG. 4.

Figure 3:
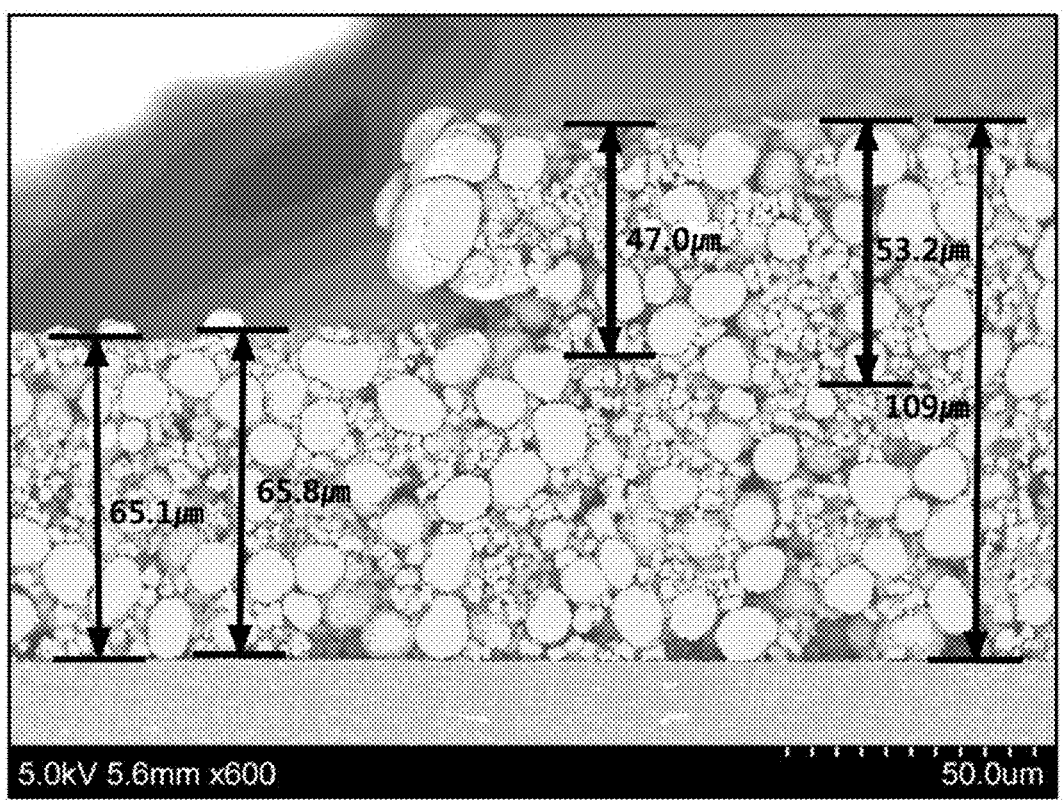
FIG. 3 is a scanning electron microscopic (SEM) image of the section of the positive electrode according to Example 1-1.
Figure 4:
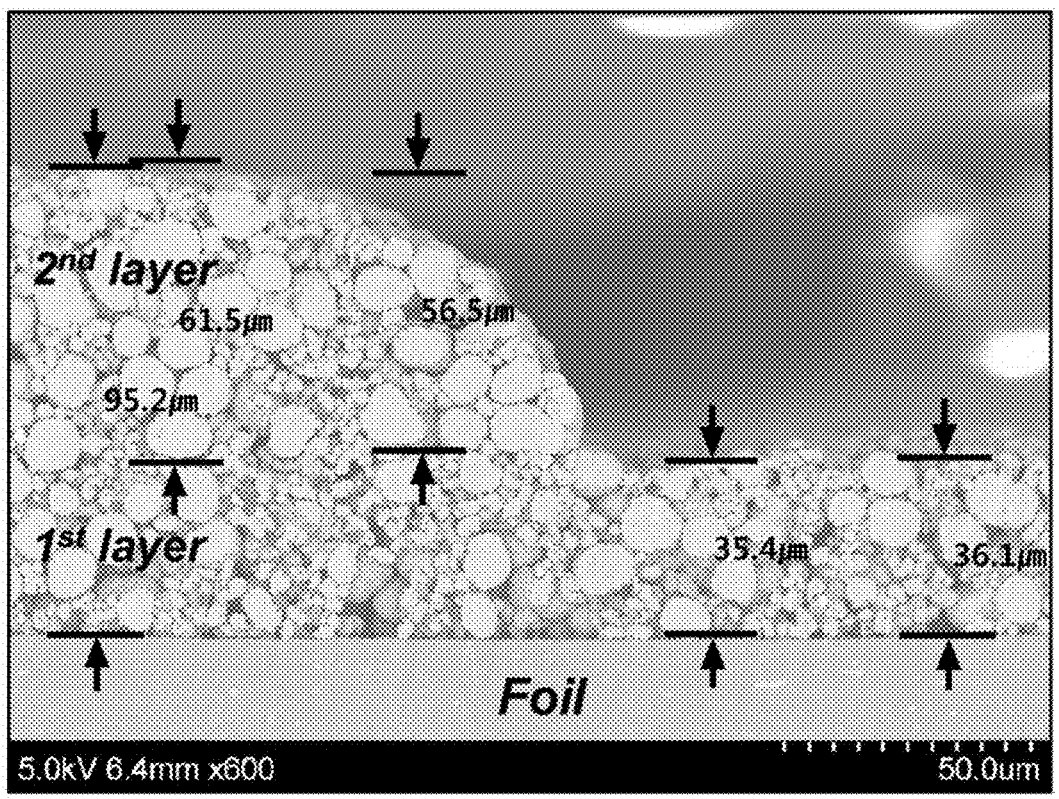
FIG. 4 is a scanning electron microscopic (SEM) image of the section of the positive electrode according to Example 2-1.

It can be seen from FIG. 3 and FIG. 4 that each of the positive electrodes according to Examples 1 and 2 has dual layers.

Test Example: Adhesion

Figure 5:
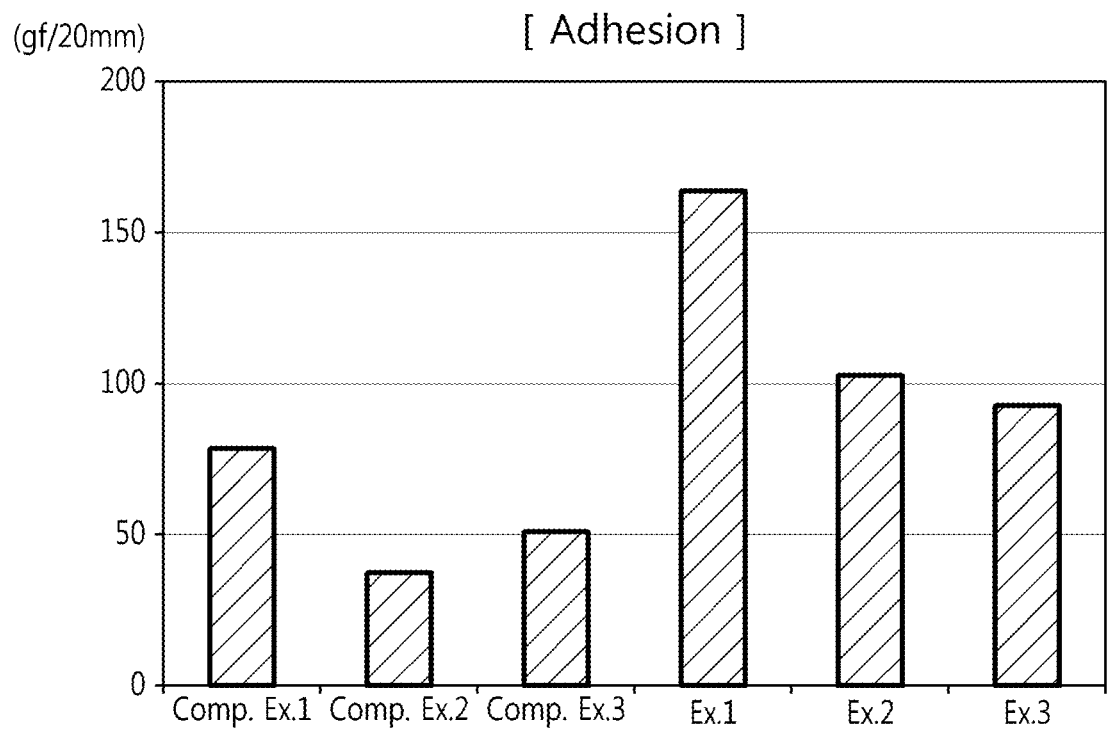
FIG. 5 is a graph illustrating the results of evaluation of adhesion for the positive electrodes according to Examples and Comparative Examples.

To evaluate the adhesion between an aluminum current collector and a lower positive electrode active material layer, each of the positive electrodes according to Examples and Comparative Examples was cut into a predetermined size and fixed to a slide glass. Then, the current collector was peeled off to measure 90° peel strength. In this manner, adhesion was evaluated. Herein, the peel strength was measured by using a universal test machine (UTM). The results are shown in Table 1 and FIG. 5.

Test Example: Binder Migration

During the drying step carried out after applying the positive electrode slurry in a coating process, solvent evaporation occurs and binder polymers migrates to the top end of the electrode together with solvents. Such a phenomenon is called migration. As binder migration becomes severe, binder polymers grow apart from the bottom current collector and adhesion to the electrode is degraded. As binder migration is inhibited, adhesion to the electrode is improved. Therefore, a test was carried out so that binder migration was inhibited during the manufacture of an electrode.

Figure 6:
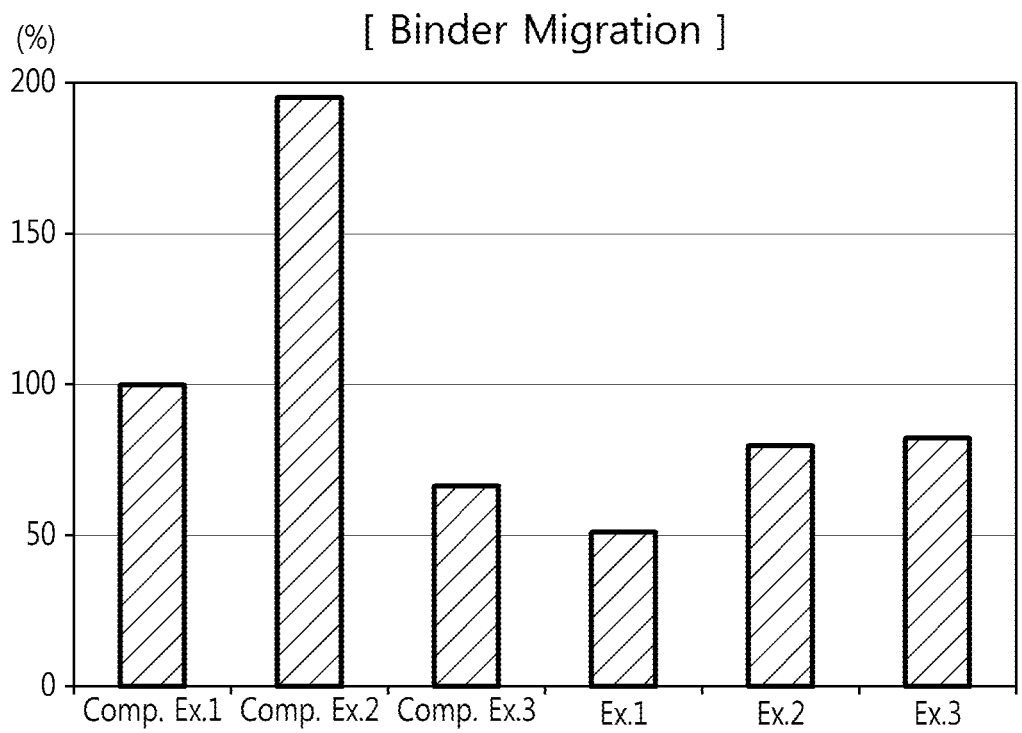
FIG. 6 is a graph illustrating the results of evaluation of binder migration for the positive electrodes according to Examples and Comparative Examples.

In this test, each of the positive electrodes according to Examples and Comparative Examples was determined for its adhesion continuously to analyze binder distribution. From the analysis, binder position was digitized and the degree of binder migration was digitized based on this. The results are shown in Table 1 and FIG. 6. Herein, Comparative Example 1 was taken as 100, and a binder migration degree smaller than 100 means that binder migration is inhibited and a binder migration degree larger than 100 means that binder migration is not inhibited.

Meanwhile, to perform an additional test, lithium secondary batteries including each of the positive electrodes according to Examples and Comparative Examples were manufactured.

To obtain the lithium secondary batteries, a negative electrode was obtained as follows. First, 96.1 wt % of artificial graphite (GT, Zichen (China)) as a negative electrode active material, 1.0 wt % of carbon black (Super-P) as a conductive material, 2.2 wt % of styrene-butadiene rubber and 0.7 wt % of carboxymethyl cellulose were added to water as a solvent to form slurry for a negative electrode active material layer. Then, the slurry was coated once on copper foil, followed by drying and compression.

Meanwhile, polypropylene was oriented uniaxially by using a dry process to obtain a microporous separator having a width of 200 mm at one side. The separator was interposed between each positive electrode and the negative electrode to provide an electrode assembly, which, in turn, was received in a pouch type battery casing. Then, 1M $LiPF_6$ carbonate-based electrolyte solution was injected to the electrode assembly to finish a battery.

Test Example: Resistance

Figure 7:
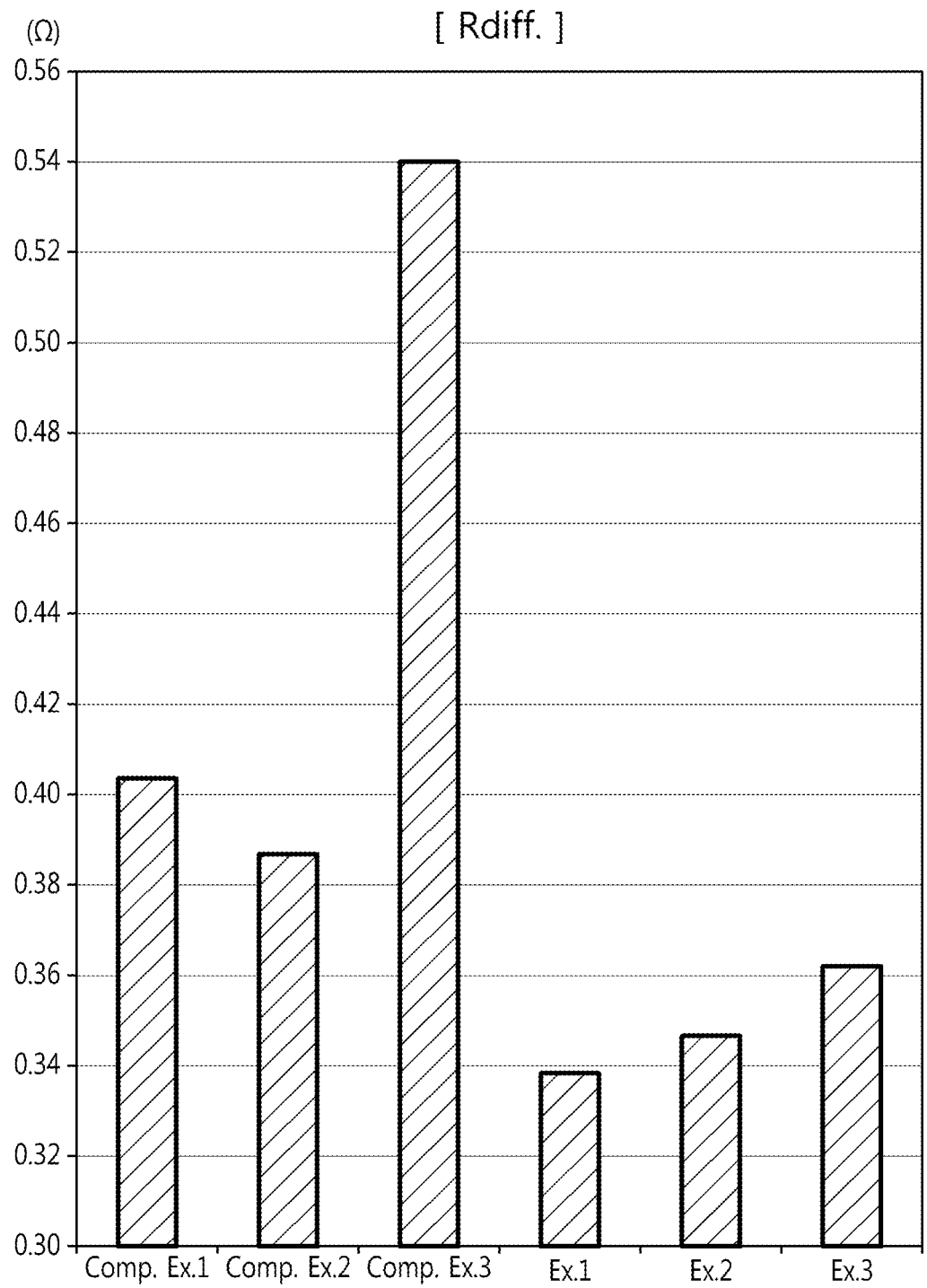
FIG. 7 is a graph illustrating the results of evaluation of resistance for the positive electrodes according to Examples and Comparative Examples.

Compositional resistance (Ω) of the secondary battery, particularly initial resistance (Ω), $R_{ohm}$ (ohmic resistance), $R_{ct}$ (charge transfer resistance) and $R_{diff}$ (diffusion resistance) were determined. The results are shown in Table 1 and FIG. 7 (conditions: state of charge (SOC) 50 and 25° C.). Herein, a smaller resistance value is better.

Particularly, the compositional resistance was determined through electrochemical impedance spectroscopy (EIS) wherein a weak alternating signal having a different frequency was imparted to a battery cell to measure the impedance so that the compositional resistance of a secondary battery might be differentiated. Since the EIS test was sensitive to temperature, the test was carried out at 25° C. similar to room temperature so that errors might be minimized.

Test Example: High-Temperature Storage Performance

Figure 8:
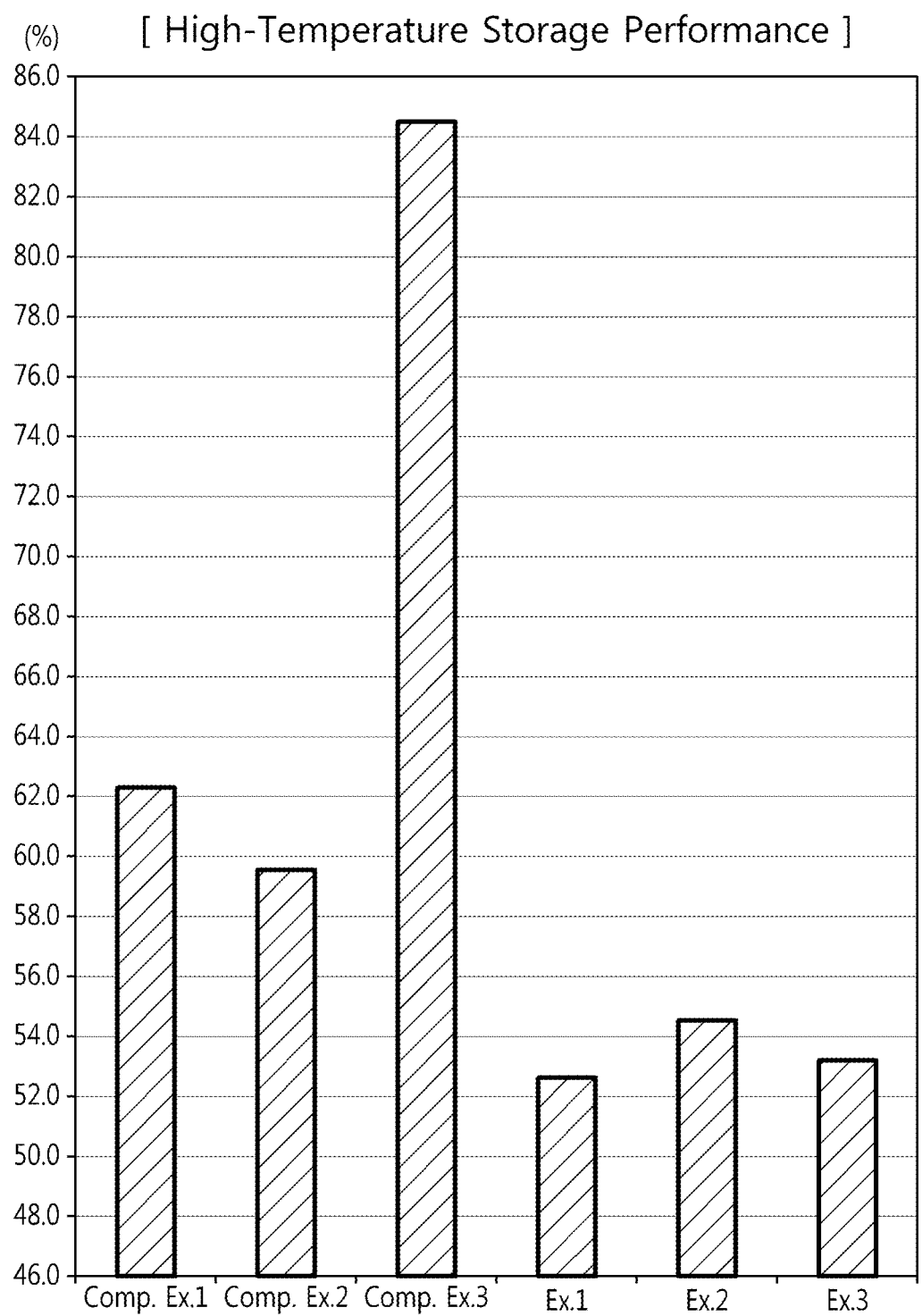
FIG. 8 is a graph illustrating the results of evaluation of high-temperature storage performance for the positive electrodes according to Examples and Comparative Examples.

Each of the secondary batteries was evaluated for high-temperature storage performance. The results are shown in Table 1 and FIG. 8 (conditions: SOC 100, 60° C.).

Particularly, each battery cell was fully charged under a condition of SOC 100 after it was manufactured. Then, the battery cell was allowed to stand in an oven at 60° C. After 6 weeks, the resistance at the $6^{th}$ week was compared with the initial resistance before standing to calculate an increase (%) in resistance of the battery cell after it was stored at high temperature. In this manner, high-temperature storage performance was evaluated.

TABLE 1

|  | Comp. Ex. 1 | Comp. Ex. 2 | Comp. Ex. 3 | Ex. 1 | Ex. 2 | Ex. 3 |
| --- | --- | --- | --- | --- | --- | --- |
| Positive electrode active material layer (Type and content of conductive material) | Single layer (carbon black 1.5 wt %) | Single layer ($CNT^{3)}$ 0.6 wt %) | Upper layer ($CNT^{3)}$ 1.5 wt %) Lower layer (carbon black 0.6 wt %) | Upper layer ($CNT^{3)}$ 0.6 wt %) Lower layer (carbon black 1.5 wt %) | Upper layer ($CNT^{3)}$ 0.6 wt %) Lower layer (carbon black 1.5 wt %) | Upper layer ($CNT^{3)}$ 0.6 wt %) Lower layer (carbon black 1.5 wt %) |
| Adhesion (90° peel strength, gf/20 mm) | 77.8 | 36.4 | 51.2 | 163.7 | 102.5 | 92.5 |
| Binder migration[1] (%) | 100 | 195 | 67 | 51 | 80 | 82 |
| Initial resistance (2.5 C, 10 sec, SOC50, Ω) | 1.18 | 1.19 | 1.62 | 1.09 | 1.11 | 1.12 |
| $R_{ohm} + R_{ct}^{2)}$ | 0.78 | 0.81 | 1.08 | 0.75 | 0.77 | 0.77 |
| $R_{diff}$ | 0.40 | 0.39 | 0.54 | 0.34 | 0.35 | 0.36 |
| Increase in resistance (6 week, %) | 62.3 | 59.5 | 84.6 | 52.6 | 54.5 | 53.2 |

[1] Comparative Example 1 is taken as 100%.
[2] $R_{ohm} + R_{ct}$: Related with interface resistance
[3] CNT: Carbon nanotubes As can be seen from Table 1 and FIG. 5 to FIG. 8, in the secondary batteries according to examples 1-3, the lower positive electrode active material layer adjacent to the current collector includes carbon black which is a sphere-type carbonaceous conductive material favorable to improvement of adhesion and decrease in interface resistance in an amount of 1.0-3.0 wt % based on the solid content of the corresponding active material layer, and the upper positive electrode active material layer includes carbon nanotubes which are a needle-type carbonaceous conductive material favorable to pore formation in an amount of 0.2-1.0 wt % based on the solid content of the corresponding active material layer. Each of the secondary batteries according to Examples 1-3 shows higher battery performance, as compared to the secondary batteries which use a single-layer positive electrode according to Comparative Examples 1 and 2 and the secondary battery which uses a dual layer positive electrode but the content of the conductive materials is not within the above-defined range according to Comparative Example 3. Particularly, in the case of Comparative Example 3, since the lower positive electrode layer includes an absolutely insufficient amount of sphere-type carbonaceous conductive material, it is not possible to impart conductivity sufficiently, and thus the '$R_{ohm}+R_{ct}$' value related with the interface resistance of the lower layer is the highest. In addition, the secondary battery according to Comparative Example 3 undergoes degradation of adhesion to cause an increase in resistance after it is stored at 60° C., thereby providing poor high-temperature storage performance. Further, the upper positive electrode active material uses an excessive amount of sphere-type carbonaceous conductive material, and thus pore formation is inhibited, resulting in an increase in $R_{diff}$.

It should be understood that the detailed description are given by way of illustration only and various changes and modifications may be made without departing from the scope of the invention as defined in the following claims. Therefore, the embodiments disclosed herein are not intended to limit the scope of the present disclosure but are for illustrative purposes only, and the scope of the present disclosure is not limited thereto. It should be also understood that the scope of the present disclosure is defined by the following claims and all equivalents thereof are also included in the scope of the present disclosure.

What is claimed is:

1. A positive electrode for a lithium secondary battery consists of: a positive electrode current collector; a lower positive electrode active material layer disposed on at least one surface of the positive electrode current collector; and an upper positive electrode active material layer disposed on the lower positive electrode active material layer, wherein the lower positive electrode active material layer comprises a first conductive material consisting of a sphere-type carbonaceous conductive material, wherein the sphere-type carbonaceous conductive material is present in an amount of 1.0 to 3.0 wt % based on a total weight of the lower positive electrode active material layer, the upper positive electrode active material layer comprising a second conductive material consisting of a needle-type carbonaceous conductive material, wherein the needle-type carbonaceous conductive material is present in an amount of 0.2 to 0.8 wt % based on a total weight of the upper positive electrode active material layer, and a content of the conductive material contained in the lower positive electrode active material layer is larger than a content of the conductive material contained in the upper positive electrode active material layer, wherein the needle-type carbonaceous conductive material has an aspect ratio ranging from 50 to 650, wherein the upper positive electrode active material layer and the lower positive electrode active material layer have a thickness ratio of 90:10-70:30.

2. The positive electrode for a lithium secondary battery according to claim 1, wherein the sphere-type carbonaceous conductive material is present in an amount of 1.2-3.0 wt % based on a total weight of the lower positive electrode active material layer.

3. The positive electrode for a lithium secondary battery according to claim 1, wherein the sphere-type carbonaceous conductive material is carbon black.

4. The positive electrode for a lithium secondary battery according to claim 1, wherein the needle-type carbonaceous conductive material is carbon nanotubes (CNT), vapor-grown carbon fibers (VGCF), carbon nanofibers (CNF) or a combination of two or more of them.

5. The positive electrode of claim 1, wherein the sphere-type carbonaceous conductive material has an average diameter (D50) of 15-40 nm.

6. The positive electrode of claim 1, wherein the aspect ratio of the needle-type carbonaceous conductive material ranges from 100-300.

7. A lithium secondary battery comprising the positive electrode for a lithium secondary battery as defined in claim 1.

8. A method for manufacturing the positive electrode for the lithium secondary battery of claim 1, comprising:

dispersing a first positive electrode active material, a first conductive material and a first binder polymer into a solvent to prepare a slurry for a lower positive electrode active material layer;

dispersing a second positive electrode active material, a second conductive material and a second binder polymer into a solvent to prepare a slurry for an upper positive electrode active material layer;

applying the slurry for a lower positive electrode active material layer to at least one surface of a positive electrode current collector; and further applying the slurry for an upper positive electrode active material layer thereto, before or after the slurry for a lower positive electrode active material layer is dried, wherein the slurry for the lower positive electrode active material layer comprises 90% or more of a sphere-type carbonaceous conductive material as a conductive material, the slurry for upper positive electrode active material layer comprises 90% or more of a needle-type carbonaceous conductive material as a conductive material, and a content of the conductive material contained in the slurry for the lower positive electrode active material layer is larger than a content of the conductive material contained in the slurry for the upper positive electrode active material layer.

* * * * *